(12) United States Patent
Ogawa et al.

(10) Patent No.: US 6,556,532 B2
(45) Date of Patent: Apr. 29, 2003

(54) OPTICAL PICKUP DEVICE

(75) Inventors: Masaru Ogawa, Ikoma (JP); Tetsuo Saeki, Ibaraki (JP)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 09/875,727

(22) Filed: Jun. 6, 2001

(65) Prior Publication Data

US 2002/0021650 A1 Feb. 21, 2002

(30) Foreign Application Priority Data

Jun. 6, 2000 (JP) ........................................ 2000-168519
Jun. 6, 2000 (JP) ........................................ 2000-168733

(51) Int. Cl.$^7$ ................................................. G11B 7/00
(52) U.S. Cl. .............................. 369/112.16; 369/112.01; 369/112.05
(58) Field of Search ........................ 369/44.11, 44.12, 369/44.14, 44.23, 112.01, 112.05, 112.09, 112.16, 112.17, 112.19, 112.28, 110.01

(56) References Cited

U.S. PATENT DOCUMENTS 5,272,685 A * 12/1993 Ando ...................... 369/44.14
6,154,433 A * 11/2000 Hoshino et al. ........ 369/112.04

FOREIGN PATENT DOCUMENTS

| JP | 2000-348374 | 12/2000 |
| JP | 2001-034989 | 2/2001 |

* cited by examiner

Primary Examiner—Muhammad Edun
(74) Attorney, Agent, or Firm—David G. Conlin; Steven M. Jensen; Edwards & Angell, LLP

(57) ABSTRACT

There can be obtained a miniaturized, 3-beam optical pickup device using a polarization separating prism of an inexpensive material and capable of reliably detecting light of a signal. The present pickup device includes an optical element having the first, second and third members, and having a first boundary surface receiving light from a semiconductor laser and reflecting and directing it toward a collimator lens, and also transmitting light reflected by an MO disc and directing it toward a photodetector, and a second boundary surface separating polarized light of light transmitted through the first boundary surface.

17 Claims, 13 Drawing Sheets

○ ORDINARY RAY
● EXTRAORDINARY RAY

○ ORDINARY RAY
● EXTRAORDINARY RAY

——— BEAM OF COLLECTED LIGHT IN DIRECTION Y
-------- BEAM OF COLLECTED LIGHT IN DIRECTION Z

OPTICAL PICKUP DEVICE

BACKGROUND OF THE INVENTION

1. Field of the Invention

The present invention generally relates to optical pickup devices and particularly to optical pickup devices used for magneto-optical disc apparatuses.

2. Description of the Background Art

In recent years there has been developed a magneto-optical disc reproduction apparatus capable of repeatedly recording and reproducing audio and video data, documents and other similar data. An optical pickup device is used as a main component of the magneto-optical disc reproduction apparatus and its miniaturization is considered important.

The present inventors have proposed a miniaturized optical pickup device in Japanese Patent Laying-Open No. 2001-034989.

With reference to FIG. 17, Japanese Patent Laying-Open No. 2001-034989 discloses an optical pickup device including a light source 103, a collimator lens 108 and an objective lens 109 collecting and passing light from light source 103 onto a magneto-optical (MO) disc 110, a photodetector 124 detecting light reflected from MO disc 110. This optical pickup device further includes a polarization separating prism 105 formed of anisotropic optical member 101 and anisotropic optical member 102, arranged on an optical path extending from light source 103 to collimator lens 108 and having an optical branching function to internally reflect light from light source 103 to guide it to collimator lens 108 and to transmit light reflected from MO disc 110.

Isotropic and anisotropic optical members 101 and 102 are arranged to have a boundary surface 105a with an inclination of 45° to an optical axis 114 of reflected light.

Thus a light beam B1 from light source 103 is directed parallel to optical axis 114 and a light beam B2 reflected by a plane of reflection 101c is directed perpendicular to optical axis 114.

In this configuration, an isotropic optical member 102 is formed for example of LiNbO3, which is stable in electrochemistry, has a large difference in refraction index, and can be produced in a large amount at one time and thus available at low cost, and isotropic optical member 101 is for example TaFD30, a dense and inexpensive optical glass available from HOYA CORP.

Light transmitted through boundary surface 105a has aberration. Thus on photodetector 124 a spot has a geometry larger than the source light, as shown in FIG. 18. Light transmitted through boundary surface 105 is separated into an ordinary ray R1 and an extraordinary ray R2. Ordinary ray R1 provides a spot having a length of 80 µm in a direction T1 and a length of 100 µm in a direction orthogonal to direction T1. Extraordinary ray R2 provides a spot having a length of 60 µm in both of a direction T2 and a direction orthogonal to direction T2. Herein, T1 and T2 are directions corresponding to a guide groove of the MO disc. A beam enlarged by aberration is detected by a light receiving portion 126 divided in four, to provide focus servo through astigmatism, and a beam is detected at a light receiving portion 125 divided in two, to provide tracking servo by a push-pull method (a 1-beam method).

Generally, if the 1-beam method is employed, shifting objective lens 109 causes unbalance of light, (hereinafter referred to as a "radial offset") on photodetector 125. As such, if the 1-beam method is implemented, the radial offset also needs to be prevented. However, to prevent the radial offset a high level of technique is required, and most of manufactures thus avoid adopting the 1-beam method. Thus the method is less prevalent in the market.

By contrast, a 3-beam method eliminates the necessity of accommodating the radial offset. As such, a simple technique is sufficient to provide stable tracking servo, which makes optical pickup devices more prevalent.

With reference to FIG. 19 is shown a spacing between a main beam and a subbeam in an optical pickup device of a typical 3-beam system. If the main beam and the subbeam are spaced by 17 µm on an MO disc 131 in a tangential direction, the beams are spaced on a photodetector 132 by approximately 50 to 60 µm, attributed to a constant of collimator lens 133 and that of objective lens 134.

From a different point of view the present inventors are also currently studying and developing a more miniaturized and highly integrated optical pickup device, as has already been proposed in Japanese Patent Laying-Open No. 2000-348374. Reference will now be made to FIGS. 20 and 21 to describe a configuration of the optical pickup device. This optical pickup device includes a stem 111, a semiconductor laser 103 provided on stem 111 to serve as a light source, a cap 113 covering stem 111, and an optically transmissive substrate 114 attached on cap 113. Furthermore the optical pickup device also includes a ½ wavelength plate 115 attached on optically transmissive substrate 114, an optical element 105 attached on ½ wavelength plate 115, and a collimator lens 108 and an objective lens 109 collecting on a magneto-optical recording medium 110 a beam of light emanating from laser diode 103. Furthermore the optical pickup device also includes a photodetector 124 arranged on stem 111 to detect light reflected from magneto-optical recording medium 110 and branched by optical element 105. On optically transmissive substrate 114 are arranged first and second diffraction elements 121 and 122.

A beam of light emanating from laser diode 103 passes through the second diffraction element 122 and is separated into transmitted light and three, positive and negative first-order diffracted beams of light. The light then passes through ½ wavelength plate 115 and it is reflected by optical element 105 at first and second surfaces 101c and 105a, passes through collimator lens 108 and objective lens 109 and is then collected on magneto-optical recording medium 110. Magneto-optical recording medium 110 provides a reflection of light, which beam is separated into an ordinary ray and an extraordinary ray at an angle of refraction determined by a ratio of a refraction index of the first member to an ordinary index of the third member, and a ratio of the refraction index of the first member to an extraordinary index of the third member. The rays then arrive at the first diffraction element 121 underlying optical member 105 and they are further separated into transmitted light and diffracted light and thus collected on photodetector 111.

Optical element 105 is formed of a first member 101 formed of an isotropic glass material and a third member 102 formed of an anisotropic material (a birefringent material). The first and third members 101 and 102 have therebetween a boundary surface serving as a polarization separating surface. A reflection of light from magneto-optical recording medium 110 that refracts at the second surface 105a has a wave aberration, which is compensated for by forming the optical element from materials so selected that an average of ordinary and extraordinary indexes of refraction of the birefrigent material forming the third member 102, and an index of refraction of the glass forming the first member 101 substantially match in value. For example, the glass material for the first member 101 may be LF5, a product of Schott Group with n of 1.5722, and the birefringent material for the third member may be lithium tetraborate having no of 1.605 and ne of 1.549.

The first diffraction element 121 is divided into first to third regions. Furthermore, photodetector 124 is structured as shown in FIG. 21. Light transmitted through the first diffraction element 121 is collected on each of photodetection portions 124e–124h. Light diffracted in the first diffraction element at the first region is collected on a boundary surface of photodetection portions 124c and 124d. Light diffracted at the second region is collected on photodetection portion 124a. Light diffracted at the third region is collected on photodetection portion 124b.

From the intensity of light detected on each photodetection portion is obtained the following information: initially, (a) a difference between signals output from photodetection portions 124c and 124d can be calculated to obtain a focus error signal based on a knife edge method. Also, (b) a difference between signals output from photodetection portion 124g and 124h can be calculated to obtain a radial error signal based on a 3-beam method. Furthermore, (c) a difference between signals output from photodetection portions 124a and 124b can be calculated to obtain a so-called push-pull signal, which is used to detect a signal of an address meandering and thus recorded in a magneto-optical recording medium. Furthermore, a magneto-optical signal can be obtained by calculating a difference between signals output from photodetection portions 124e and 124f.

In the optical pickup device as described above, a beam of light emanating from semiconductor laser 103 and following an optical path to arrive at magneto-optical recording medium 110, does not pass any other extra optical branching element than a polarizer prism and the second diffraction element 122. This ensures that light can be used efficiently. Furthermore, employing a single photodetector 124 to detect all of a magneto-optical signal, a focus error signal and a radial error signal, can reduce the area of the photodetector. Thus the optical pickup device can further be miniaturized and manufactured at a further reduced cost.

In the FIG. 17 optical pickup device, however, aberration results in a beam having a size no less than 60 μm on photodetector 124, as shown in FIG. 18. Thus, while the device is advantageous for the push-pull method (1-beam method), it is not applicable without modification in the form of an optical pickup device in the 3-beam system, since in the 3-beam system a main beam and a subbeam are hardly arranged as appropriate.

Furthermore in the FIG. 20 optical pickup device the birefringent material for the third member, i.e., lithium tetraborate is expensive and it is also deliquescent and thus needs to be protected for example by a moisture-proof coating. This increases the cost of the entire optical pickup device. If the third member is formed of lithium niobate, a stable and inexpensive birefringent material, the optical pickup device can be manufactured at a low cost.

However, lithium niobate has high ordinary and extraordinary indexes no and ne of 2,258 and 2.178, respectively. Since glass material has an index of refraction of at most approximately two and wave aberration cannot be compensated for by selecting an average of ordinary and extraordinary indexes of refraction of lithium niobate and an index of refraction of glass serving as the first member, to substantially match each other in value. In other words, wave aberration cannot be compensated for for both of ordinary and extraordinary rays in the birefringent material. Thus for example if lithium niobate is combined with SF2, an inexpensive glass material produced by Schott Group having n of 1.635, then a problem would occur as described below: when light reflected from a magneto-optical recording medium refracts at the second surface, an angle of refraction determined by a ratio of a refraction index of glass to the ordinary index of lithium niobate and by a ratio of the refraction index of glass to the extraordinary index of lithium niobate, is increased and the reflected light thus would have a wave aberration. If wave aberration is introduced at the second surface 105a, light transmitted through the first diffraction element 121 and light diffracted thereby would both similarly have wave aberration. Thus, as shown in FIG. 22, in directions Y and Z a focal point has a positional displacement, and on the photodetector a beam of light is collected in the form of a spot distorted as shown in FIG. 23, and would thus be increased in size. This makes it difficult to design a beam arrangement, and furthermore an error introduced in fabricating an optical pickup unit, expansion and contraction of unit components that are attributed to changes in the environment thereof, and the like can result in a beam spot missing the photodetector. Consequently, the photodetector outputs a false signal. Thus, reliable signal reproduction cannot be achieved.

SUMMARY OF THE INVENTION

The present invention contemplates a miniaturized, 3-beam optical pickup device capable of detecting a stable signal if an optical element thereof is formed of an inexpensive material.

The present invention in one aspect provides an optical pickup device including: a light source; a lens arranged on an optical path extending from the light source to a magneto-optical recording medium; an optical element arranged on an optical path extending from the light source to the lens, and separating polarized light of light reflected by the magneto-optical recording medium; and a photodetector detecting light separated by the optical element. The optical element includes: a first member formed of an isotropic optical medium, receiving light from the light source and reflecting the received light to direct the reflected light to the magneto-optical recording medium; a second member formed of an isotropic optical medium and arranged adjacent to the first member, further passing the light reflected by the magneto-optical recording medium and having passed through the first member; and a third member formed of an anisotropic optical medium and arranged adjacent to the second member, separating via a boundary surface of the second and third members the light having passed through the second member, and directing the separated light to the photodetector.

The first and second members have therebetween a boundary surface branching light, and the second member formed of an isotropic optical medium and the third member formed of an anisotropic optical medium have therebetween a boundary surface separating polarized light of light reflected by a magneto-optical recording medium. Thus, light-branching and light separation can be provided independently and light after separation of polarization can have an aberration adjusted independently. This can provide an increased degree of freedom in design, such as reducing the size of a beam on a photodetector, to provide a miniaturized optical pickup device in a 3-beam system.

In the pickup device of the above one aspect preferably the first member is a prism having a cross section in a parallelogram having first parallel surfaces opposite to each other and second parallel surfaces opposite to each other each having a predetermined angle relative to the first parallel surface, one of the first parallel surfaces being in contact with the second member, one of the second parallel surfaces being arranged opposite to the light source, the other of the second parallel surfaces being arranged opposite to the lens.

As such the light source can be accommodated internal to a package to miniaturize the optical pickup device.

In the optical pickup device of the above first aspect still preferably the first and second members have the same index of refraction.

The first and second members having the same index of refraction can prevent reflected light transmitted through their boundary surface from having an aberration.

Still preferably the anisotropic optical medium is LiNbO3.

The anisotropic optical medium of LiNbO3 allows the optical pickup device to be produced at low cost.

In the optical pickup device of the above first aspect still preferably a ratio of an index of refraction of the isotropic optical medium to a larger one of indexes of refraction of the anisotropic optical medium, is at least approximately 0.77.

Since the ratio of the refraction index of the isotropic optical medium to the larger refraction index of LiNbO3 is no less than approximately 0.77, beam aberration can be reduced. Furthermore, if a component has a dimension tolerance, a fabrication tolerance and the like having an effect to change a beam's position the beam can be prevented from missing a light receiving portion of a photodetector.

In the optical pickup device of the above first aspect still preferably the second and third members have the boundary surface with an angle α° relative to an optical axis of the reflected light to satisfy the following equation:

$$\alpha°=65\pm5\times(n/n1/0.77)$$

wherein n represents the index of refraction of the isotropic optical medium and n1 represents the larger one of indexes of refraction of the anisotropic optical medium.

We have confirmed in an experiment that if inclination α falls within a range of angle represented by the above expression a beam can be free of a significant aberration and furthermore if a component has a dimension tolerance, a fabrication tolerance and the like having an effect to change the beam's position the beam can be prevented from missing a light receiving portion of a photodetector.

Still preferably the anisotropic optical medium is YVO4.

The anisotropic optical medium of YVO4 allows ordinary and extraordinary rays to be spaced wider to provide an increased degree of freedom in beam arrangement on a photodetector.

In the optical pickup device of the above first aspect still preferably a ratio of an index of refraction of the isotropic optical medium to a larger one of indexes of refraction of the anisotropic optical medium, is at least approximately 0.72.

Since the ratio of the refraction index of the isotropic optical medium to the larger refraction index of YVO4 is no less than approximately 0.72, beam aberration can be reduced. Furthermore, if a component has a dimension tolerance, a fabrication tolerance and the like having an effect to change a beam's position the beam can be prevented from missing a light receiving portion of a photodetector.

In the optical pickup device of the above first aspect still preferably the second and third members have the boundary surface with an angle α° relative to an optical axis of the reflected light to satisfy the following equation:

$$\alpha°=67\pm7\times(n/n1/0.72)$$

wherein n represents the index of refraction of the isotropic optical medium and n1 represents the larger one of indexes of refraction of the anisotropic optical medium.

We have confirmed in an experiment that if inclination α falls within a range of angle represented by the above expression a beam can be free of a significant aberration and furthermore if a component has a dimension tolerance, a fabrication tolerance and the like having an effect to change the beam's position the beam can be prevented from missing a light receiving portion of a photodetector.

The optical pickup device of the above first aspect still preferably further includes two ½ wavelength plates, one of the ½ wavelength plates being arranged between the light source and the boundary surface of the second and third members, the other of the ½ wavelength plates being arranged between the boundary surface of the second and third members and the lens.

Arranging two ½ wavelength plates allows the optical pickup device to be generally reduced in thickness, in addition to providing a function to direct readily reflectable, s-polarized light to a boundary surface of the first and second members and also allowing a magneto-optical recording medium to receive polarized light orthogonal to a guiding group.

The optical pickup device of the above first aspect can further include a diffraction element arranged between the optical element and the photodetector and having a hologram pattern compensating for a wave aberration introduced when the boundary surface of the second and third members refracts light.

With this configuration, (a) a polarization separating prism can correct wave aberration and (b) a diffraction element can also correct wave aberration. As such, if the polarization separating prism is formed of an inexpensive material a beam can be reduced in size and also arranged as desired. Thus furthermore reliable photodetection can be achieved.

In the optical pickup device of the above first aspect the hologram pattern corresponds to a locus of a point H on the diffraction element satisfying a relationship:

$$(LH-PH)'=n\lambda$$

wherein L represents a point of light transmitted through a first diffraction element and collected, LH represents an optical path length between point H and a point L, P represents a point of light diffracted by the first diffraction element and collected on the photodetector, PH represents an optical path length between point P and point H, λ represents a wavelength of a beam of light, n represents an integer, (LH−PH)' represents a difference between optical path lengths LH and PH with a wave aberration at the boundary surface considered together with one of optical path lengths LH and PH.

This hologram pattern allows a diffraction element to set each beam's arrangement, as desired, in a 3-beam method.

The present invention in a second aspect provides an optical pickup device including: a light source emanating a beam of light; and light collecting means receiving the beam of light emanating from the light source, and collecting the received beam of light on a magneto-optical recording medium. The optical pickup device further includes an optical element formed of an isotropic optical member formed of an isotropic optical medium and an anisotropic optical member formed of an anisotropic optical medium, arranged between the light source and the light collecting means, the isotropic and anisotropic optical members having a boundary surface therebetween serving as a polarization separating surface. The optical pickup device further includes: a photodetector receiving light reflected by the magneto-optical recording medium and directed thereto; and a first diffraction element arranged between the optical element and the photodetector to receive and direct light from the optical element to the photodetector. In the optical pickup device the first diffraction element has a hologram pattern compensating for a wave aberration introduced when the boundary surface refracts light.

The first diffraction element has a hologram pattern compensating for a wave aberration introduced when light refracts passing through a boundary surface of the first and third members. As such, if the optical element is formed of an inexpensive material, reliable signal detection can be achieved. More specifically, in addition to reliable signal detection, the third member, conventionally formed of a particularly expensive material, can be provided at low cost.

In the optical pickup device of the above second aspect the hologram pattern corresponds to a locus of a point H on the first diffraction element satisfying a relationship:

$$(LH-PH)'=n\lambda$$

wherein L represents a point of light transmitted through a first diffraction element and collected, LH represents an optical path length between point H and a point L, P represents a point of light diffracted by the first diffraction element and collected on the photodetector, PH represents an optical path length between point P and point H, $\lambda$ represents a wavelength of a beam of light, n represents an integer, (LH-PH)' represents a difference between optical path lengths LH and PH with a wave aberration at the boundary surface considered together with one of optical path lengths LH and PH.

The above hologram pattern can be calculated with a computer and it can be formed efficiently on a transparent substrate through photolithography and reactive ion etching (RIE). Consequently, a larger cost reduction can be achieved than when the third member is formed of expensive lithium tetraborate.

The above described present optical pickup device includes a signal detection block detecting a signal only via light diffracted by the first diffraction element.

Since only diffracted light is used to detect a signal, modifying a parameter in designing the first diffraction element allows a spot of collected light to be arranged as desired to facilitate arranging a photodetector in designing the optical pickup device.

In the above described present optical pickup device the first diffraction element is serrated, as seen in cross section.

With the first refraction element serrated as seen in cross section, enhancing a refraction efficiency and increasing an amount of light directed to a photodetector can increase a signal-to-noise ratio to reliably reproduce a signal.

In the above described present optical pickup device between the light source and the optical element on an optical path there may exist a second refraction element. Arranging the second diffraction element allows a stable tracking signal to be output in a 3-beam method. Furthermore in the above described present optical pickup device the optical element includes the third member formed of lithium niobate. In the present invention it is not necessary to combine glass material and birefringent material of the optical element to reduce the difference between the refractive index of the first member and that of the third member. Thus for example such inexpensive materials as lithium niobate and SF2, a product of Schott Group, can be selected and combined.

In the above described present optical pickup device the optical element has opposite sides each provided with a ½ wavelength plate of resin.

Arranging a ½ wavelength plate as described above allows a light beam emanating from a light source to have polarization in a direction set as desired and furthermore can provide a more inexpensive optical pickup device than when a wavelength plate using a crystal such as quartz is arranged.

In the above described present optical pickup device the light source and the photodetector are arranged in a single package having a translucent window and airtight sealed.

The light source and the photodetector that are arranged in a single, airtight sealed package can have a stable, relative positional relationship maintained for a long period of time to provide a durable optical pickup device.

In the optical pickup device of the above second aspect the isotropic optical member is formed of two isotropic optical media having different indexes of refraction and has a boundary surface formed by the two isotropic optical media and a boundary surface formed by the anisotropic medium and one of the isotropic media so that light reflected by the magneto-optical recording medium can pass through both of the boundary surfaces successively.

Thus in a polarization separating prism at a boundary surface of isotropic optical media light can branch and at a boundary surface of an isotropic optical medium and an anisotropic optical medium polarized light can be separated. As such, in addition to the function of the diffraction element having the hologram pattern, as described above, light-branching and light separation of light reflected from a magneto-optical recording medium can be independently provided. Thus, furthermore reliable photodetection can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
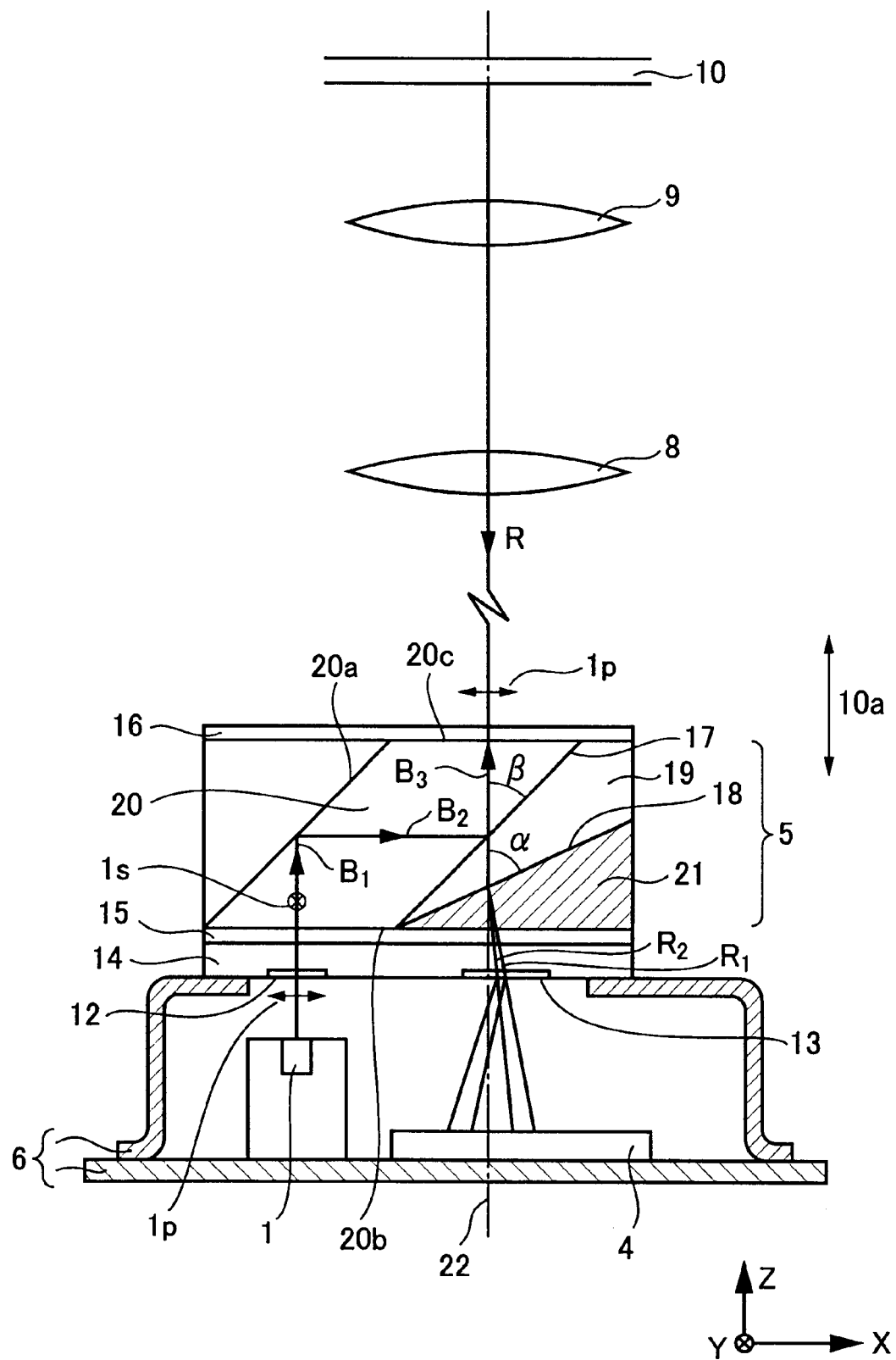
FIG. 1 shows a schematic configuration of an optical pickup device according to a first embodiment of the present invention.

With reference to FIG. 1 the present invention in a first embodiment provides an optical pickup device including a package 6 housing a semiconductor laser 1 serving as a light source and a photodetector 4, a quartz substrate 14 arranged on package 6 and provided with diffraction elements 12 and 13, a ½ wavelength plate 15 arranged on quartz substrate 14, an optical element 5 arranged on ½ wavelength substrate 15, a ½ wavelength plate 16 arranged on optical element 5, and a collimator lens 8 and an objective lens 9 arranged on an optical path between ½ wavelength plate 16 and an MO disc 10 to pass light from semiconductor laser 1 and collect it onto MO disc 10.

Optical element 5 includes first, second and third members 20, 19 and 21 and has first and second boundary surfaces 17 and 18. The first boundary surface 17 reflects light from semiconductor laser 1 and directs it to collimator lens 8 and transmits light reflected by MO disc 10 and directs it to photodetector 4. The second boundary surface 18 separates polarization of light transmitted through the first boundary surface 17.

The first boundary surface 17 is a surface corresponding to a boundary of the first and second members 20 and 19 each formed of glass of an isotropic optical medium and having the same index of refraction and it is arranged with an inclination β of 45° to an optical axis 22 of the aforementioned reflected light. Thus, light from semiconductor laser 1 can be directed on an optical path B1 parallel to optical axis 22, on an optical path B2 perpendicular to optical axis 22, and on an optical path B3 coaxially. As such, semiconductor laser 1 and the first boundary surface 17 can be readily arranged and assembled.

The second boundary surface 18 is a surface serving as a boundary of the second member 19 and the third member 21 of an anisotropic optical medium and it is arranged with an inclination a relative to optical axis 22. Inclination α will be described hereinafter more specifically.

The first member 20 has a surface 20a parallel to the first boundary surface 17, a surface 20b in a direction adjacent to the first boundary surface 17 and a surface 20c parallel to surface 20b. Light from semiconductor laser 1 is incident on surface 20b parallel to optical axis 22, reflected by surface 20a and then directed perpendicular to optical axis 22, reflected by boundary surface 17, directed along optical axis 22, and emerges through surface 20c.

Polarization for the aforementioned optical path will now be described. Preferably, MO disc 10 receives polarized light orthogonal to a direction 10a of a guiding groove. As such, semiconductor laser 1 is set to emanate the p-polarized light 1p, which is in turn received by ½ wavelength plate 15 and turned into s-polarized light 1s susceptible of reflection at boundary surface 17 and then received by ½ wavelength plate 16 and again turned into p-polarized light 1p before it arrives at MO disc 10.

Furthermore, adopting this configuration allows a direction perpendicular to the plane of FIG. 1 to correspond to a direction in which the optical pickup device has its thickness. Thus the optical pickup device can generally be reduced in thickness. For the ½ wavelength plates, wavelength plates of a mono-plate zero-order mode type of resin, such as Arton produced by JSR Corporation, can be used to prevent the optical pickup device from further increasing in size.

MO disc 10 provides a reflection of light R, which has a direction of polarization rotated by Kerr effect according to information recorded in MO disc 10.

The reflection of light R is incident on surface 20c and thus enter optical element 5 and arrives at the first boundary surface 17. Here, the reflection of light R is branched from optical path B2 coming from semiconductor laser 1 and enters the second member 19. Since the first and second members 20 and 19 are formed of glass having the same index of refraction, the refraction of light R arrives at the second boundary surface 18 without changing its direction or having any aberration. Boundary surface 18 transmits and thus introduces the reflection of light R into the third member 21, the optically anisotropic third member separates the reflection of light R into ordinary and extraordinary rays of light R1 and R2 having their respective directions of polarization orthogonal to each other.

Figure 2:
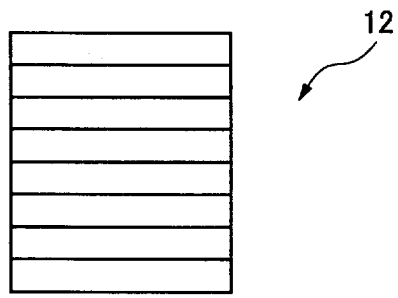
FIG. 2 shows a diffraction element.

Light from semiconductor laser 1 is divided previously by the second diffraction element 12, formed as shown in FIG. 2, into two subordinate tracking beams (hereinafter simply referred to as "subbeams") and a single, main, signal recording and reproducing beam (hereinafter simply referred to as a "main beam") for a total of three beams of light. For each of these three beams an ordinary ray and an extraordinary ray are generated. Thus, a total of six beams of light are transmitted through the first diffraction element 13.

Figure 3:
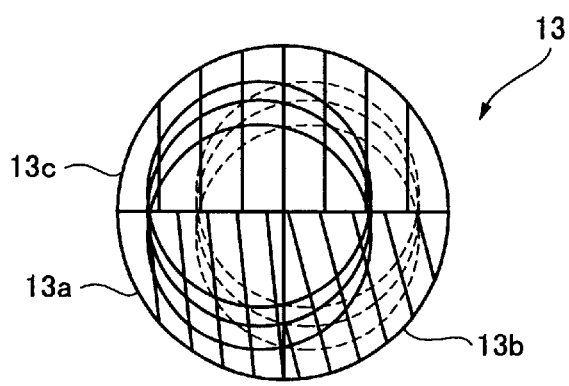
FIG. 3 shows a diffraction element.
Figure 4:
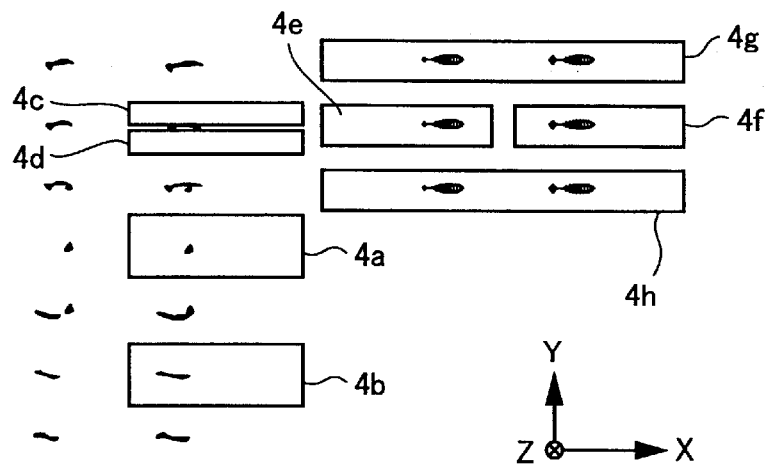
FIG. 4 shows a configuration of a photodetector and a position of a beam incident thereon.

With reference to FIG. 3, diffraction element 13 are divided into three regions 13a, 13b and 13c each having a grating different in spacing and direction. With reference to FIG. 4, the main beam diffracted by region 13a is incident on photodetector 4 at a light receiving portion 4a, the main beam diffracted by region 13b is incident on photodetector 4 at a light receiving portion 4b, and the main beam diffracted by region 13c is incident on photodetector 4 at a border line of light receiving portions 4c and 4d. The main beam transmitted through diffraction element 13 as a zero-order diffracted light is incident on light receiving portions 4e and 4f. The two subbeams transmitted through diffraction element 13 as zero-order diffracted light are incident on light receiving portions 4g and 4h.

Thus, from a differential of signals output from light receiving portions 4c and 4d a focus error signal is obtained according to a Foucault method and from a differential of signals output from light receiving portions 4g and 4h a tracking error signal is obtained according to a 3-beam method. Furthermore, from a differential of signals output from light receiving portions 4a and 4b a push-pull signal is obtained and used to detect a signal of an address provided by a guiding groove winding on MO disc 10. A magneto-optical signal is obtained from a differential of signals output from light receiving portions 10e and 10f.

Inclination α will now be described more specifically with reference to an example.

FIG. 4 represents an arrangement of a beam on photodetector 4 when the third member 21 is formed of LiNbO3 having an ordinary index of 2.258 and an extraordinary index of 2.178 and the first and second members 20 and 29 are formed of TaFD30, glass having an index of refraction of 1.869 with α of 65°.

Light receiving portions 4g, 4e and 4h are 40 μm wide and each spaced by 20 μm, and so are light receiving portions 4g, 4f and 4h, although boundary surface 18 is set to have an inclination of 65° to optical axis 22 to reduce beam aberration. This allows main and subordinate beams to be arranged in a 3-beam method.

Herein, the ratio of the refraction index of the second member to the larger refraction index of the third member (hereinafter simply referred to as the "refraction index ratio") is 0.83. Such a combination will be referred to as a combination (A).

Figure 5:
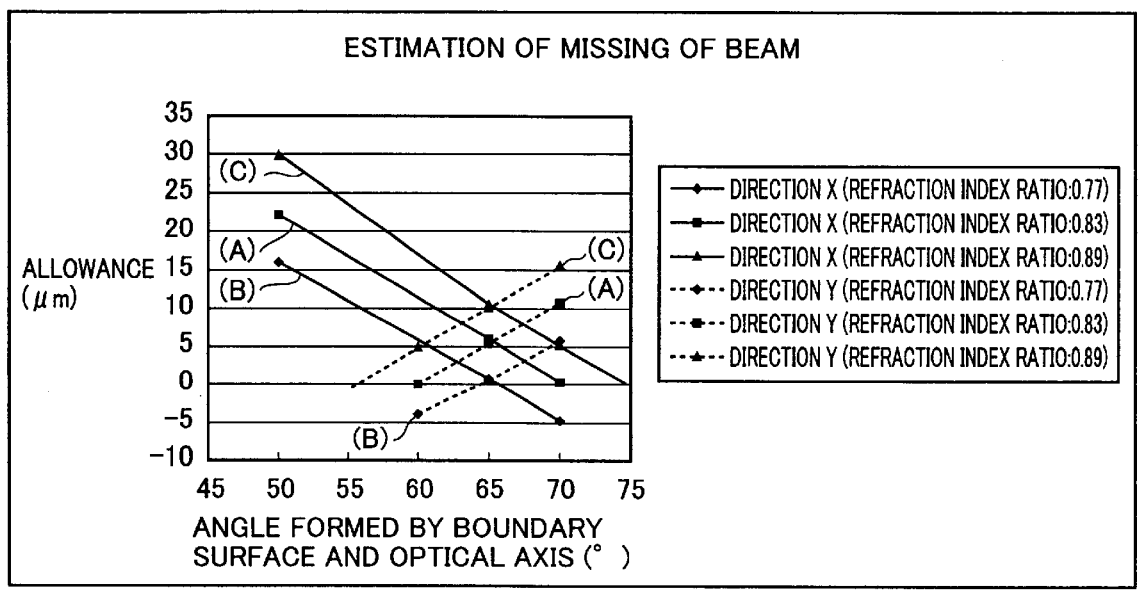
FIG. 5 represents a relationship between inclination $\alpha$ and allowance for a beam missing a light receiving portion.

FIG. 5 is a graph of allowance for a beam missing a light receiving portion (hereinafter simply referred to as "allowance") versus inclination α for different refraction index ratio combinations. In plotting the allowance, effects of dimension and fabrication tolerances of all of the components of the optical pickup device, are taken into consideration. A solid line represents an allowance in a direction of a longer side of photodetector 4 (direction X in FIG. 4) and a dotted line represents an allowance in a direction of a shorter side of photodetector 4 (direction Y in FIG. 4). Herein, the refraction index ratio combinations are combination (A) and two other combinations.

For one of the other two combinations, hereinafter referred to as "combination (B)," the third member 21 is formed of LiNbO3 and the first and second members 20 and 19 are formed of SF55, an optical glass produced by Schott Group having a refraction index of 1.744, to provide a refraction index ratio of 0.77.

For the other of the two other combinations, hereinafter simply referred to as "combination (C)," the third member 21 is formed of LiNbO3 and the first and second members 20 and 19 are formed of LaSF35, an optical glass produced by Schott Group having a refraction index of 2.0003, to provide a refraction index ratio of 0.89.

It can be understood from FIG. 5 that if the third member 21 is formed of LiNbO3, to ensure allowance or a value no less than 0 along the vertical axis a refraction index ratio of at least 0.77 is required. For combination (A), setting α approximately in a range of 60° to 70° ensures allowance. For combination (C), setting α approximately in a range of 55° 75° ensures allowance. For combination (B), α of around 65° ensures allowance.

Thus, if glass has an index of refraction n, allowance can be ensured by setting inclination α approximately in a range of angle represented by the following equation (1):

$$\alpha = 65 \pm 5 \times (n/2.258/0.77) \quad (1)$$

wherein the above expression is represented in degree. Note that inclination α of 65° provides maximal allowance.

Thus in the present embodiment boundary surface 17 of the first and second members 20 and 19 branches light and boundary surface 18 of the second member 19 formed of an isotropic optical medium and the third member 21 formed of an anisotropic optical medium separates polarized light of light reflected from a magneto-optical recording medium. Thus, light-branching and light separation can be independently provided, and aberration of light after polarized light is separated can be independently adjusted. As such, a degree of freedom in design is improved, such as capable of reducing a beam in size on photodetector 4, to miniaturize an optical pickup device in a 3-beam system.

Furthermore, the first and second members 20 and 19 having the same index of refraction can prevent reflected light transmitted through their boundary surface 17 from having an aberration.

Furthermore the anisotropic optical medium is LiNbO3 and an inexpensive optical pickup device can thus be provided.

Second Embodiment

A second embodiment provides an optical pickup device similar in configuration to that of the first embodiment described with reference to FIG. 1, except that in the second embodiment the third member 21 is formed of YVO4 providing an ordinary index of 1.973 and an extraordinary index of 2.189 and photodetector 4 has a light receiving portion partially different as will be described hereinafter.

Figure 6:
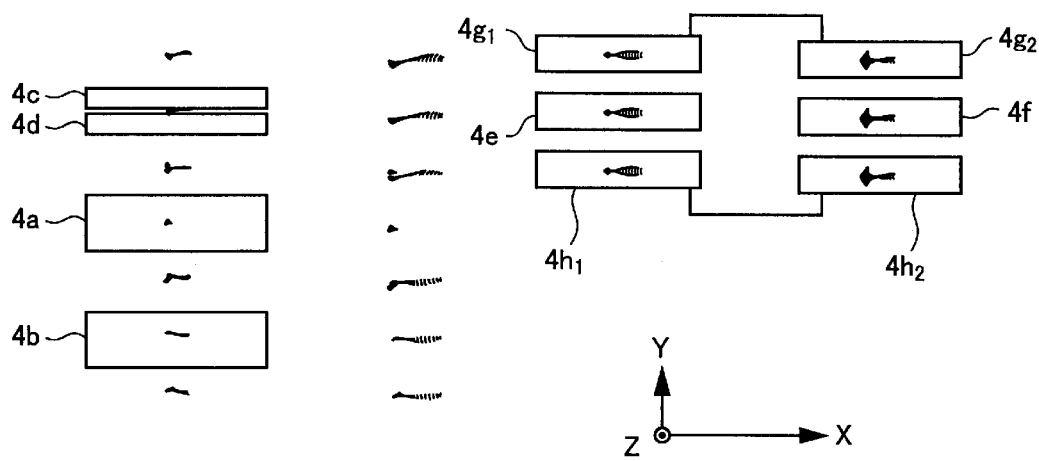
FIG. 6 shows a configuration of a photodetector and a position of a beam incident thereon.

FIG. 6 shows a beam arrangement on photodetector 4 when the second member 19 is formed of LF5, an optical glass produced by Schott Group having a refraction index of 1.572, the third member 21 is formed of YVO4, and the second boundary surface 18 is set to have inclination α of 65° to optical axis 22. It can be understood from FIG. 6 that a main beam and subbeams can be arranged in a 3-beam system. Herein a refraction index ratio of 0.72 is provided. Such a combination will be referred to as combination (D).

Light receiving portions 4g and 4h described with reference to FIG. 4 are herein further divided into light receiving portions 4g1 and 4g2 and light receiving portions 4h1 and 4h2, respectively. Light receiving portions 4g1 and 4g2 are electrically interconnected and so are light receiving portions 4h1 and 4h2.

Note that light receiving portions 4g2, 4f and 4h2 are arranged slightly offset relative to light receiving portions 4g1, 4e and 4h1 downward, as seen in the figure, since YVO4 has ordinary and extraordinary indexes with a large difference of 0.216 therebetween and the extraordinary ray walks off significantly.

Figure 7:
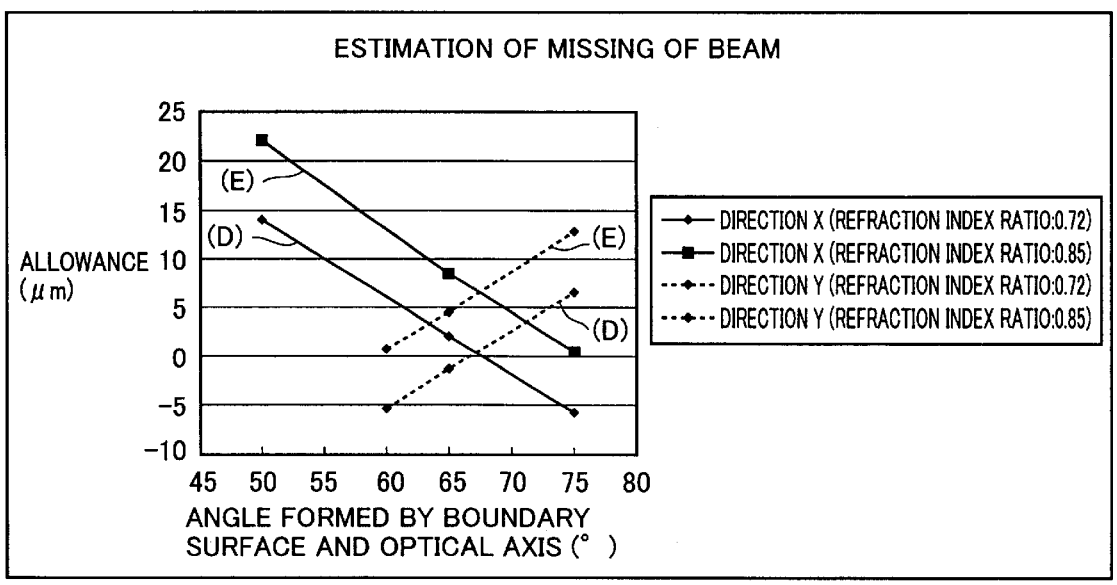
FIG. 7 represents a relationship between inclination $\alpha$ and allowance for a beam missing a light receiving portion.

FIG. 7 is a graph of allowance versus inclination α for combinations of the third and second members 21 and 19 to provide different refraction index ratios. In plotting the allowance, effects of dimension and fabrication tolerances of all of components of the optical pickup device, are taken into consideration. A solid line represents an allowance in a direction of a longer side of photodetector 4 (direction X in FIG. 6) and a dotted line represents an allowance in a direction of a shorter side of photodetector 4 (direction Y in FIG. 6). The combinations for different refraction index ratios are combination (D) and a combination (E) using the third member 21 of YVO4 and the second member 19 of TaFD30, glass having a refraction index of 1.869, to provide a refraction index ratio of 0.85.

It can be understood from FIG. 7 that if the third member 21 is formed of YVO4, to ensure allowance a refraction index ratio of at least 0.72 is required. For combination (E), setting inclination α approximately in a range of 60° to 74° ensures allowance. For combination (D), setting inclination α around 67° ensures allowance.

Thus, if glass has an index of refraction n then allowance can be ensured by setting inclination α approximately in a range of angle represented by the following expression (2):

$$\alpha = 67 \pm 7 \times (n/2.189/0.72) \qquad (2)$$

wherein the above expression is represented in degree. Note that inclination α of 67° provides maximal allowance.

Note that in the second embodiment inclination α has a possible range in value larger than in the first embodiment using LiNbO3, since YVO4 can provide a difference between a refraction index for ordinary ray R1 and that for extraordinary ray R2 larger than LiNO3 and on photodetector 4 ordinary ray R1 and extraordinary ray R2 can be spaced significantly wide.

In each of the first and second embodiments a refraction index ratio would have an upper limit, as considered below: if the anisotropic optical member is LiNbO3 then its refraction index ratio would have an upper limit corresponding to 1/0.77 time the smaller refraction index and if the anisotropic optical member is YVO4 then its refraction index ratio would have an upper limit corresponding 1/0.72 time the smaller refraction index, although glass having such a refraction index does in general not exist. Thus the upper limits of the refraction index ratios will not be discussed.

While in the first and second embodiments their anisotropic members are formed of LiNbO3 and YVO4, respectively, they are not limited thereto and may for example be an anisotropic optical member having an index of refraction higher than typical glass and having a large refraction index difference between unit vectors nx, ny and nz orthogonal to each other, such as KTiOPO4 or Gd2SiO5.

Furthermore, the information recording medium used is not limited to MO disc 10 and it may be a read only memory (ROM) disc having pits formed therein, a phase change disc, and the like. For such information recording media, an information recording signal is obtained from a summation signal of light receiving portions 4e and 4f. For a phase change disc, in particular, at least one of ½ wavelength plates 15 and 16 is provided with a phase difference plate and the phase change disc receives circularly or elliptically polarized light to enhance signal quality. If the phase difference plate is a wavelength plate of resin, slightly changing the thickness can enhance signal quality.

In the present embodiment the anisotropic optical medium is YVO4. Thus, ordinary and extraordinary rays of light can be spaced wide to provide an increased degree of freedom in arranging beams on photodetector 4.

Third Embodiment

Figure 8:
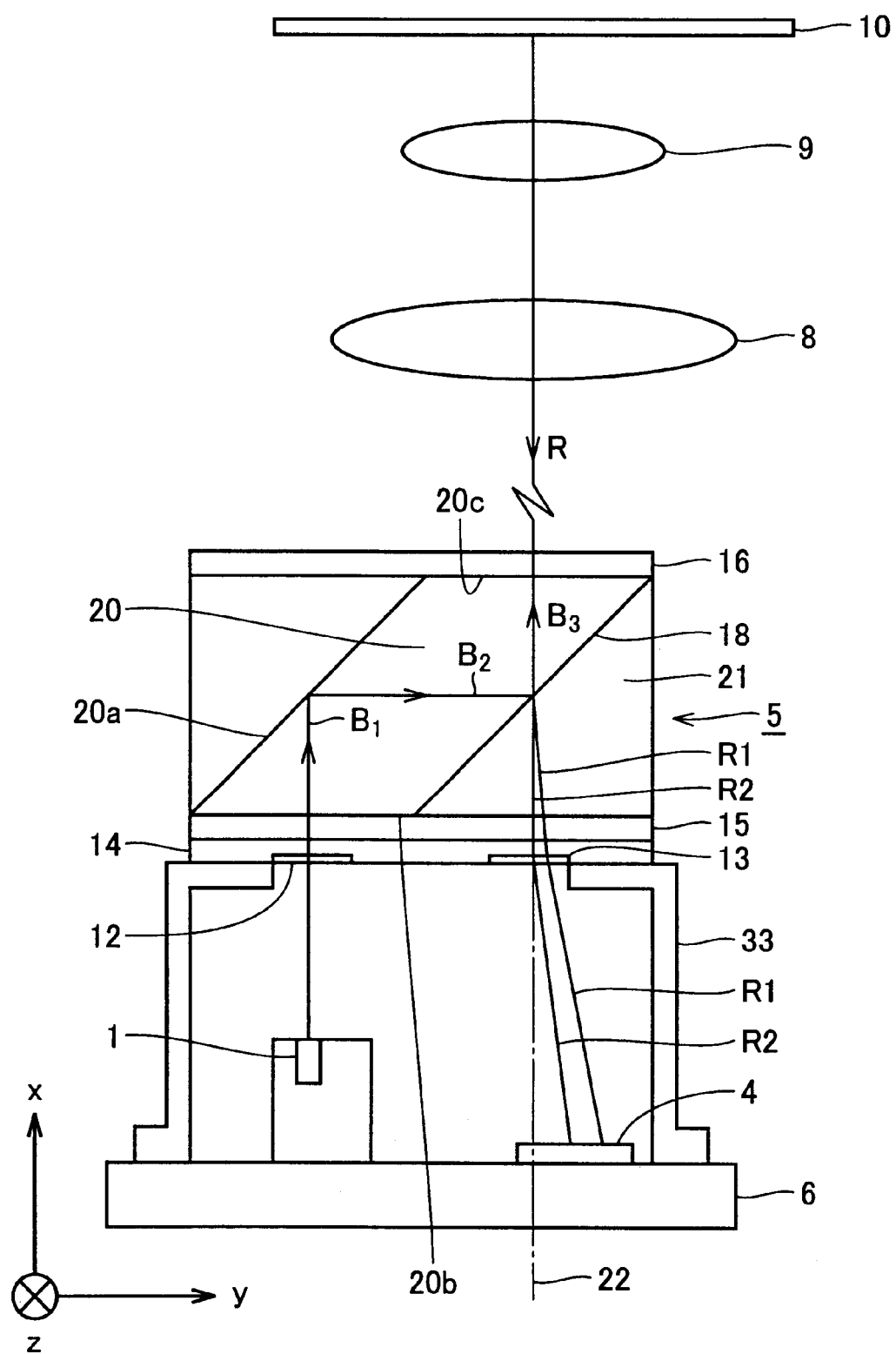
FIG. 8 is a side view of a configuration of an optical pickup device in a third embodiment of the present invention.

Reference will now be made to FIG. 8 to describe an optical pickup device in a third embodiment of the present invention. The present embodiment provides an optical pickup device including a stem 6, a light source 1 arranged on stem 6 and generating a beam of light, and a collimator lens 8 and an objective lens 9 receiving the beam of light emanating from light source 1 to collect the beam of light on a magneto-optical recording medium 10. The optical pickup device also includes an optical element 5 formed of a first member 20 of an isotropic optical medium and a third member 21 of an anisotropic optical medium and arranged between light source 1 and collimator lens 8. The first and third members are stacked together, providing a surface 18 serving as a polarization separating surface. The optical pickup device also includes ½ wavelength plates 15 and 16 arranged on optical element 5 at input and output sides, respectively, and a photodetector 4 arranged in the same package as light source 1. Furthermore, the optical pickup device includes a first diffraction element 13 divided into three regions and provided with a hologram pattern compensating for a wave aberration introduced when boundary surface 18 refracts light. The first diffraction element diffracts light reflected by magneto-optical recording medium 10 and having polarized light separated by boundary surface 18, and directs it to photodetector 4. In directing light to the photodetector, it compensates for the wave aberration described above. Furthermore, photodetector 4 includes a signal detection means using only diffracted light obtained through the first diffraction element 13 to detect a signal.

The first ½ wavelength plate 15, arranged between light source 1 and optical element 5, is formed of resin and it receives a beam of p-polarized light emanating from the light source and converts it to s-polarized light. The second ½ wavelength plate 16, arranged between optical element 5 and collimator lens 8, is also formed of resin and converts s-polarized light having passed through the optical element to p-polarized light. Optical element 5 has a polarization separating surface 18 arranged on an optical path between light source 1 and collimator lens 8 and serving to separate polarized light of light reflected by magneto-optical recording medium 10. Furthermore, optical element 5 is formed of the first member 20 of isotropic optical material and the third member 21 of anisotropic optical material. A beam of light emanating from semiconductor laser 1 passes only through the first member 20 and arrives at collimator lens 8 and it is collected by objective lens 9 onto magneto-optical recording medium 10. Magneto-optical recording medium 10 provides a reflection of light which then passes through the first member 20, has a portion transmitted by boundary surface 18 or a polarization separating surface and thus directed to the third member 21. Since the third member 21 is formed of anisotropic optical material, the reflection of light from the magneto-optical medium is separated into two components, i.e., ordinary and extraordinary components of light R1 and R2. The two components refract into the third member at their respective different angles of refraction and are directed in different directions. The ordinary and extraordinary components of light pass through the third member 21 and ½ wavelength plate 15 and are then diffracted by the first diffraction element 13 and collected on photodetector 4.

On an optical path on an optically transmissive substrate 14, provided with the first diffraction element 13, that extends from light source 1 to optical element 5 there is arranged a second diffraction element 12. A beam of light emanating from light source 1 is divided by the second diffraction element 12 into two tracking beams and a single, signal recording and reproducing beam for a total of three beams. Thus, before it arrives at the first diffraction element 13, light reflected from magneto-optical recording medium 10 has ordinary and extraordinary components of light for each of the three beams generated by the second diffraction element 12 and it is thus separated into a total of six beams of light.

Figure 9:
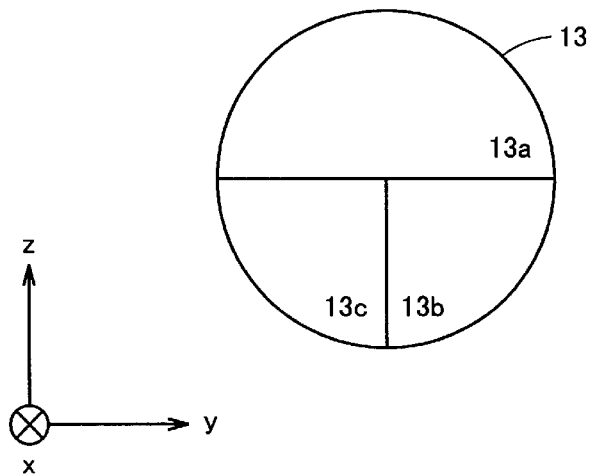
FIG. 9 shows an appearance of a first diffraction element of the optical pickup device in the third embodiment.
Figure 10:
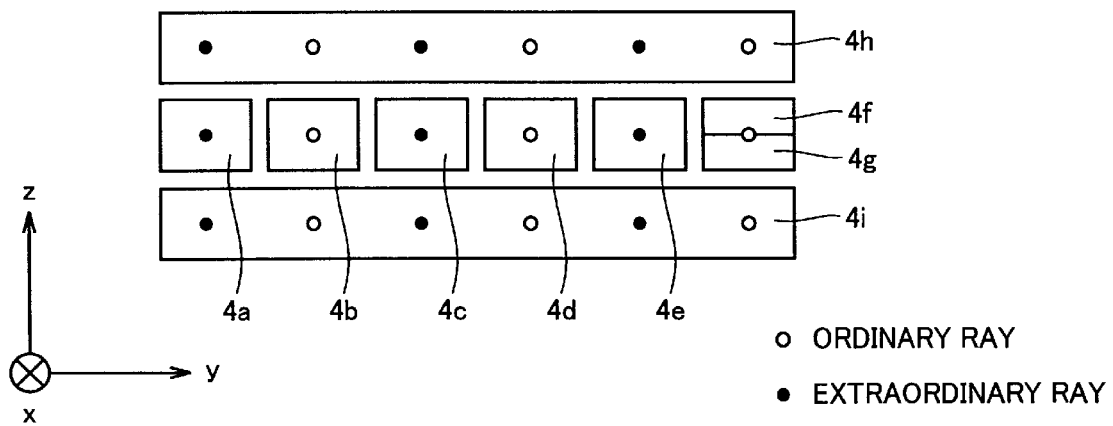
FIG. 10 shows an example of a photodetector of the optical pickup device in the third embodiment.
Figure 21:
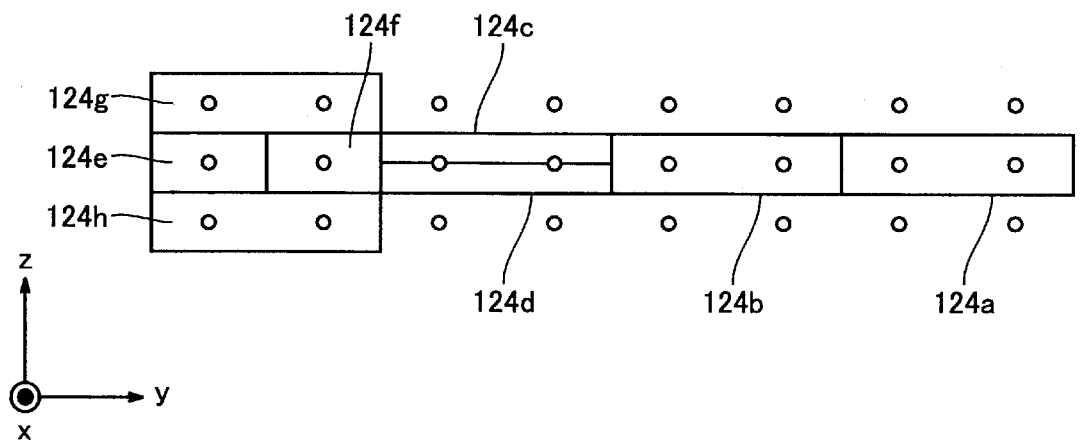
FIG. 21 is a top view of a photodetector of a conventional optical pickup device.

The first diffraction element 13 are divided into three regions 13a, 13b and 13c, as shown in FIG. 9. Diffraction element 13 has a hologram pattern compensating for a wave aberration introduced when boundary surface 18 provides a refraction of light. The first diffraction element 13 only compensates for wave aberration of light diffracted by the first diffraction element 13 and it does not compensate for wave aberration of light transmitted through the first diffraction element 13. As such, light transmitted through the first diffraction element 13 would be collected on photodetector 4 in the form of a large spot. Accordingly, only light refracted by the first diffraction element 13 is used to detect each signal. As such, as shown in FIG. 10, the photodetector does not have a light receiving portion receiving light transmitted through the first diffraction element, i.e., light receiving portions 124e–124h as shown in FIG. 21. In FIG. 10, however, a virtual light receiving portion corresponding to the FIG. 21 light receiving portions 124e–124h can be assumed. A virtual point light source L is a point collecting light at such a virtual light receiving portion.

Photodetector 4 as shown in FIG. 10 has segmented light receiving portions 4a–4i. These light receiving portions are light receiving portions receiving diffracted light, corresponding to the FIG. 21 light receiving portions 124a–124d. Of a signal recording and reproducing beam of light incident on the first diffraction element 13 at the first region 13a, an ordinary component of light is guided onto a border line of 4f and 4g and an extraordinary component of light is guided onto 4e. Furthermore, a tracking beam of light incident on the first diffraction element 13 at the first region 13a, is guided onto 4h and 4i. Of a signal recording and reproducing beam of light incident on the first diffraction element 13 at the second region 13b, ordinary and extraordinary components of light are guided onto 4d and 4c, respectively. Furthermore, a tracking beam of light incident on the first diffraction element 13 at the second region 13b, is guided onto 4h and 4i.

Of a signal recording and reproducing beam of light incident on the first diffraction element 13 at the third region 13c, ordinary and extraordinary components of light are guided onto 4b and 4a, respectively. Furthermore, a tracking beam of light incident on the first diffraction element 13 at the third region 13c, is guided onto 4h and 4i. Thus on photodetector 4 a total of 18 spots of collected light are formed. If the FIG. 10 photodetection portions 4a–4i output signals Ia–Ii, respectively, the following operations can be used to obtain each signals. More specifically:

(A) By operating (If–Ig) a focus error signal can be obtained according to a knife edge method;

(B) By operating (Ih–Ii) a radial error signal can be obtained according to a 3-beam method;

(C) By operating (Ia+Ib)–(Ic+Id) an address signal can be obtained; and (D) By operating (Ia+Ic+Ie)–(Ib+Id+If+Ig) a magneto-optical signal can be obtained.

Figure 11:
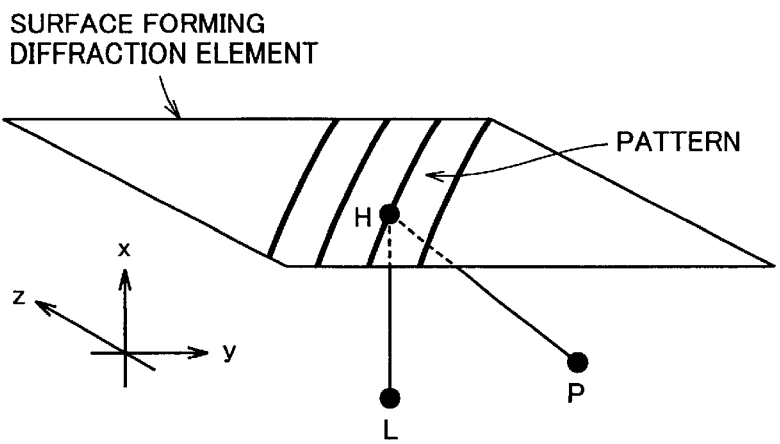
FIG. 11 is a schematic diagram representing a method using a computer hologram to fabricate the first diffraction element of the optical pickup device in the third embodiment.
Figure 14:
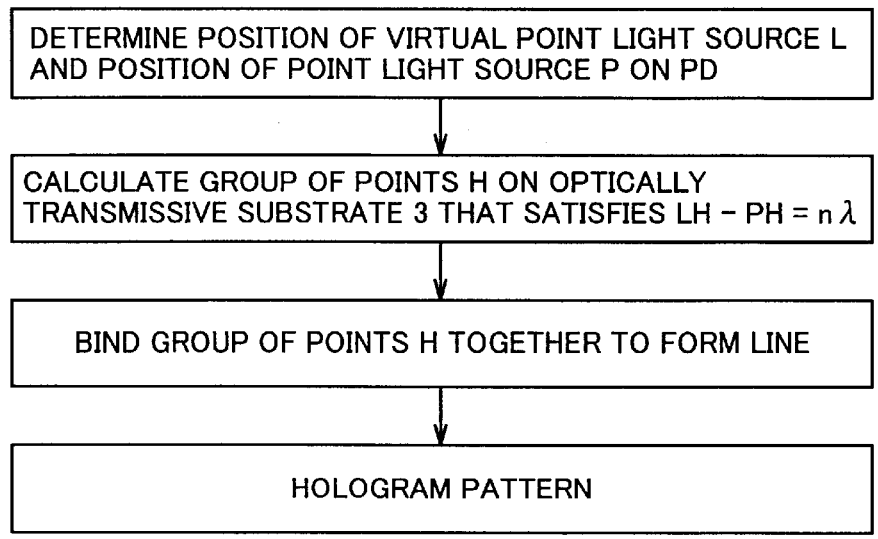
FIG. 14 is a flow chart of designing a computer hologram excluding a function compensating for aberration.

A generally well known computer hologram can be used to design the first diffraction element 13, as will now be described with reference to FIGS. 11 and 14. The first diffraction element 13 hologram pattern becomes an interference stripe on optically transmissive substrate surface 14 of light diverging from the two points of a virtual point light source position L and point P of light collected on the photodetector. The virtual point light source position is a point at which light transmitted through the first diffraction element is collected and it corresponds to the FIG. 21 regions 124e–124h and is a virtual point which is not provided in FIG. 10. Although it is a virtual point, it is a point actually existing to be shown as regions 124a–124h in FIG. 21 and the FIG. 10 photodetector merely excludes a light receiving portion receiving it. Point P of collected light on the photodetector is a point at which light diffracted by the first diffraction element collects and the diffracted light is received in each region shown in FIG. 10. If it is not necessary to compensate for wave aberration, the first diffraction element would have a hologram pattern corresponding to a set of points H on the first diffraction element 12 allowing an optical path from point H to point L and that from point H to point P to have a difference matching a wavelength multiplied by an integer. More specifically, the first diffraction element 13 would have a pattern corresponding to a curve formed of points H bound together that satisfies a relationship represented by an equation LH−PH= $n\lambda$, wherein n represents an integer and $\lambda$ represents a wavelength.

Figure 15:
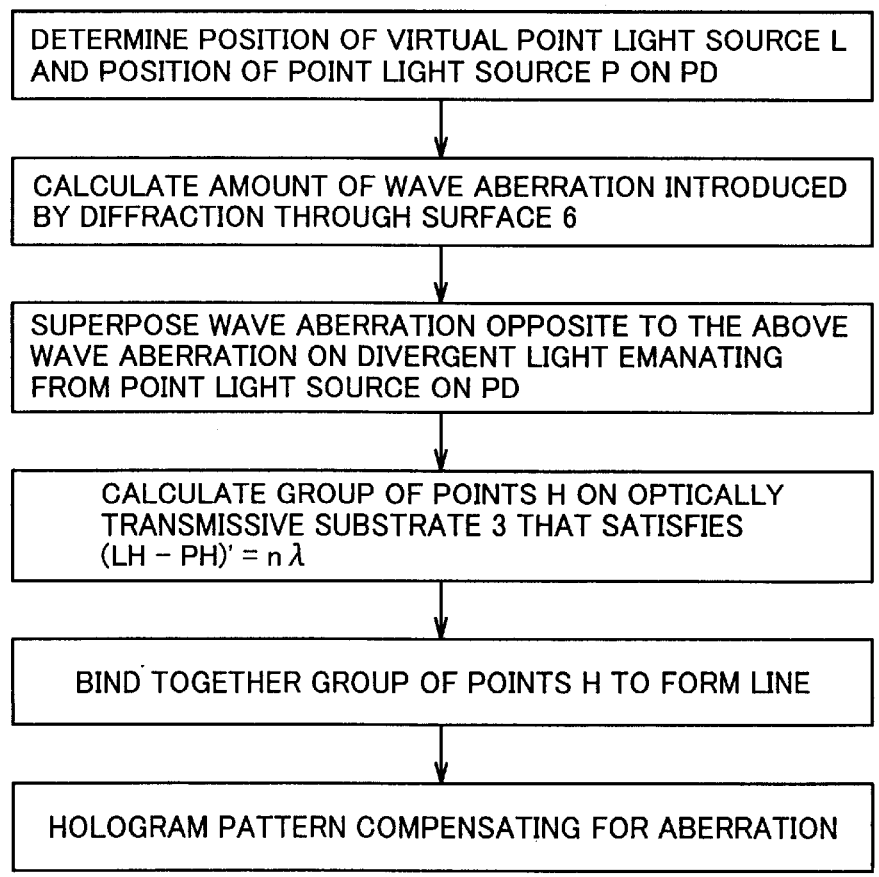
FIG. 15 is a flow chart of designing a computer hologram having a function compensating for aberration.

As has been described above, the ratio between a refraction index of the first member 20 and that of the third member 21 determines a refraction at boundary surface 18, the refraction introduces a wave aberration, and the wave aberration is compensated for by the first diffraction element 13. To fabricate the first diffraction element 13 serving as described above, a hologram pattern is formed, as described below:

A virtual light source L is set to correspond to a point on a virtual photodetector at which light transmitted through the first diffraction element collects, and on divergent light emanating from this light source, wavefront information opposite to a light beam including a wave aberration is simply superposed in calculating the above equation. More specifically, if (LH)' represents a length of optical path length LH with a wave aberration considered, a locus of point H providing (LH)'−PH=$n\lambda$ is formed to form a hologram pattern. Furthermore, as shown in the FIG. 15 flow chart, if (PH)' represents an optical path length from point P of collected light to point H with the aforementioned wave aberration information superposed thereon, a locus of point H satisfying LH−(PH)'=$n\lambda$ may be calculated. As has been described above, (LH−PH)'=$n\lambda$ means that one of the two calculations is provided.

For the above hologram pattern, if the first diffraction element 13 has a rectangular cross section a diffraction efficiency of approximately 40% can only be obtained. If the first element has a cross section serrated as shown in the figure a diffraction efficiency of 100% can be obtained and signal quality can thus be improved.

Figure 13:
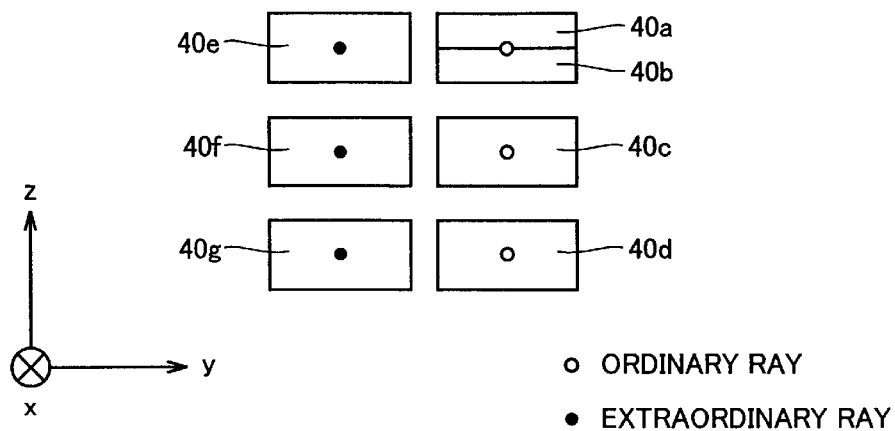
FIG. 13 shows one example of a photodetector of the optical pickup device in the third embodiment.

Furthermore the second diffraction element 12 may be eliminated to increase optical-coupling efficiency of an optical path extending from light source 1 to magneto-optical recording medium 10. In this case, a tracking error signal is detected in a push-pull method, rather than a 3-beam method. The magneto-optical recording medium only receives a signal recording and reproducing beam. Accordingly, photodetector 4 would have a total of six spots of light collected thereon and photodetector 4 would have thereon a light receiving portion formed as shown in FIG. 13. Of light incident on the first diffraction element 13 at the first region 13a, an ordinary component of light is directed onto a line dividing photodetection portions 40a and 40b and an extraordinary component of light is directed onto photodetection portion 40e. Of light incident on the first diffraction element 13 at the second region 13b, ordinary and extraordinary components of light are directed onto photodetection portions 40c and 40f, respectively. Of light incident on the first diffraction element 13 at region 13c, ordinary and extraordinary components of light are directed onto photodetection portions 40d and 40g, respectively. If photodetection portions 40a–40g output signals Ia–Ig, respectively, a focus error signal can be obtained from the following operations:

(A) By operating (Ia–Ib) a focus error signal can be obtained according to a knife edge method;

(B) By operating (Ic+If)–(Id+Ig) a radial error signal and an address signal can be obtained according to a push-pull method; and (C) By operating (Ia+Ig+Ic+Id)−(Ie+If+Ig) a magneto-optical signal can be detected.

Fourth Embodiment

Figure 12:
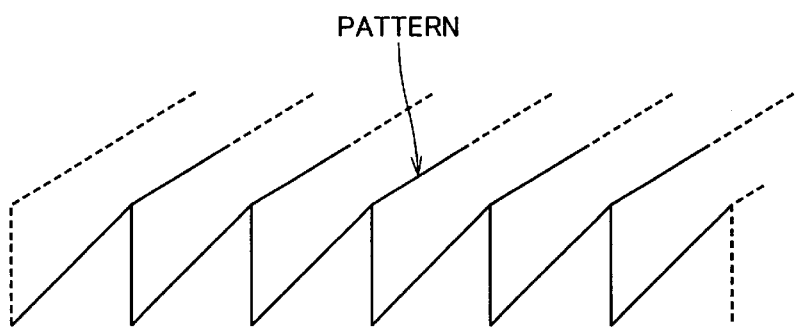
FIG. 12 is a cross section of the first diffraction element of the optical pickup device in the third embodiment.
Figure 16:
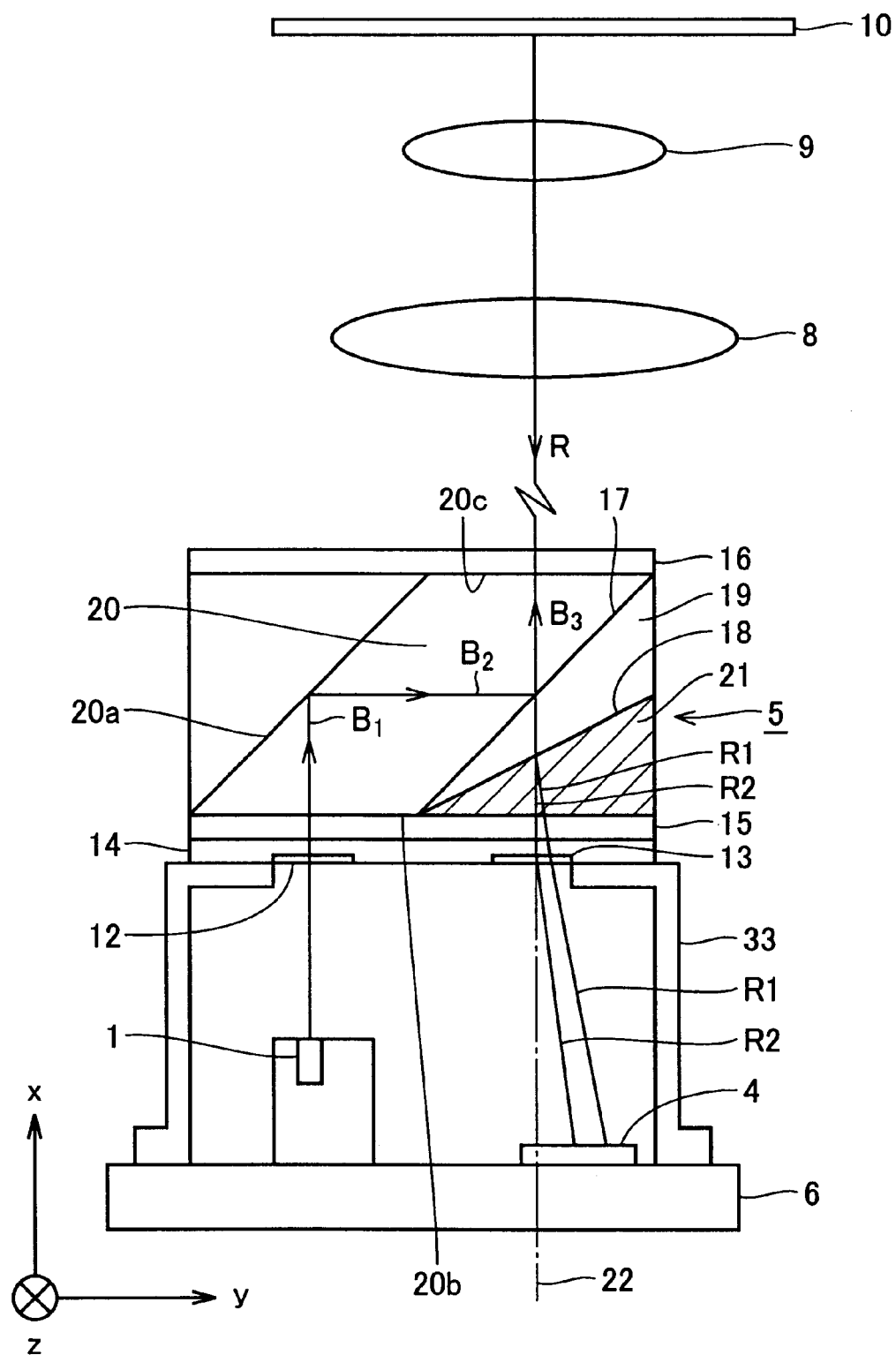
FIG. 16 shows a pickup device in a fourth embodiment of the present invention.
Figure 17:
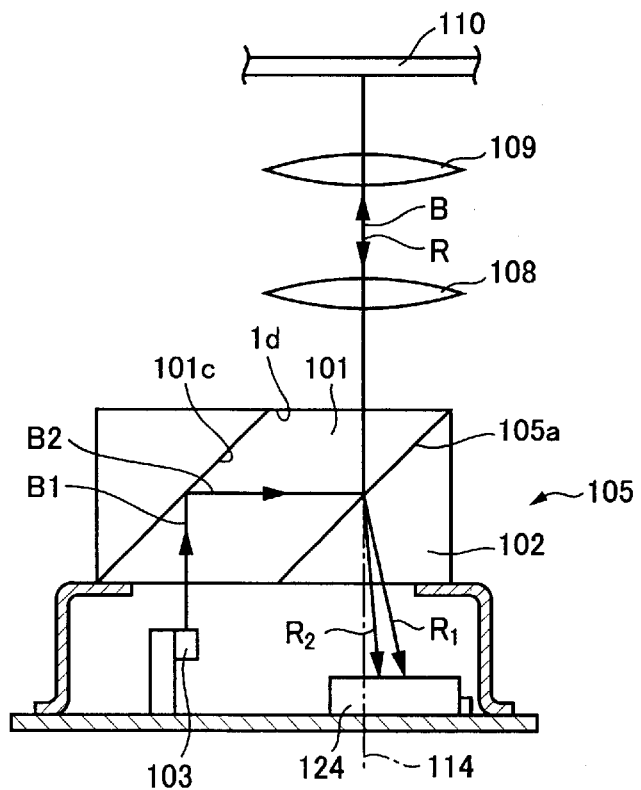
FIG. 17 shows a schematic configuration of a conventional optical pickup device.
Figure 18:
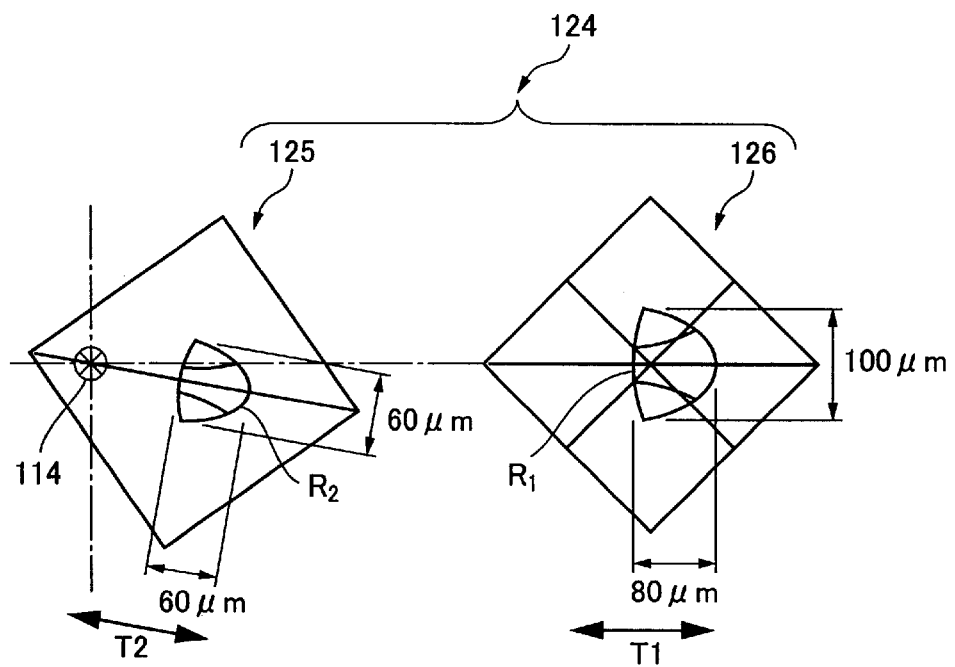
FIG. 18 shows a configuration of a photodetector and a length of beam incident thereon.
Figure 19:
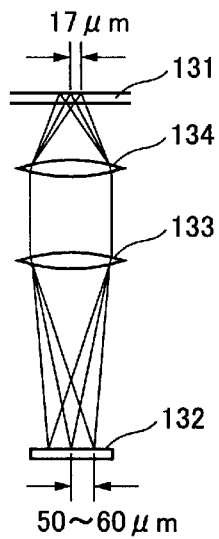
FIG. 19 shows a schematic configuration of a typical, 3-beam optical pickup device.
Figure 20:
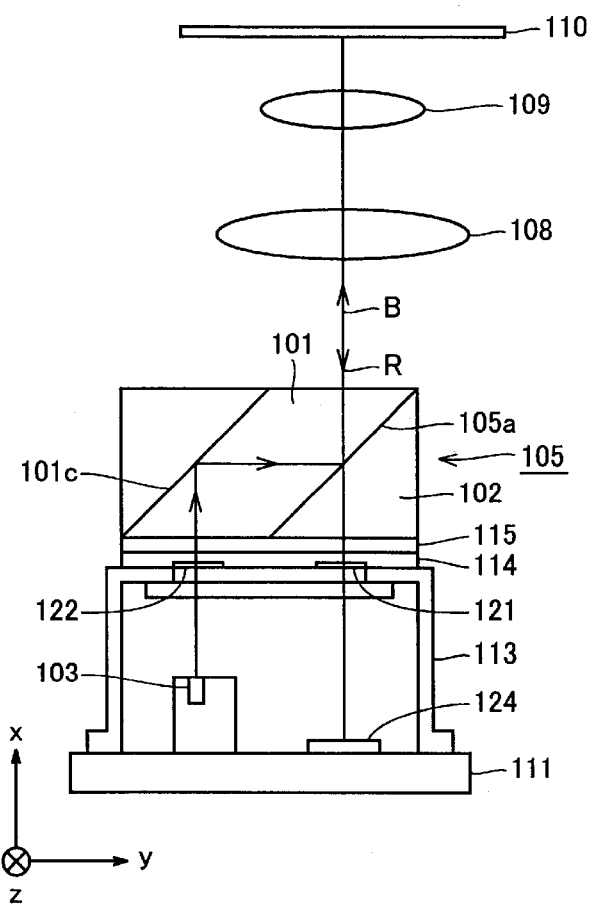
FIG. 20 is a side view of a conventional optical pickup device.

FIG. 16 shows an optical pickup device in a fourth embodiment of the present invention. As shown in FIG. 16, this optical pickup device includes a first diffraction grating 13 of the third embodiment and optical element 5 having the same configuration as that of the first embodiment. More specifically, the first diffraction grating 13 is configured to have the same hologram pattern as shown in FIGS. 9, 11 and 12. Furthermore, optical element 5 has a boundary surface 17 formed by the first and second, isotropic optical members 20 and 19, and a boundary surface 18 formed by the second member 19 and anisotropic optical member 21.

Thus, optical element 5 and the first diffraction grating 13 can both be used to adjust a wave aberration introduced when optical element 5 passes light. As such, a large number of optical signal beams used in a 3-beam method can be arranged on photodetector 4 at appropriate positions and reliably detected.

EXAMPLE

The optical element is formed of materials such as will now be described by way of example. Optical element 5 includes the first and third members 20 and 21 formed for example of SF2, a product of Schott Group having n of 1.635, and lithium niobate having no of 2.258 and ne of 2.178, respectively. In this example there is a large difference between the refraction index of the first member 20 and the mean of the ordinary and extraordinary indexes of the third member 21 and at boundary surface 18 ordinary and extraordinary rays refract significantly in the direction of an axis+y and astigmatism and coma are introduced. However, the first diffraction element 13, arranged between boundary surface 18 and photodetector 4, has a hologram pattern to offset or reduce a wave aberration introduced when boundary surface 18 refracts light. Thus on photodetector 4 a spot of collected light can be obtained in the form of a point, as shown in FIG. 10. Thus, the first diffraction element 13 adapted to compensate for wave aberration allows a beam to form a small point on photodetector 4, as shown in FIG. 10. This can facilitate beam arrangement and design on photodetector 4 and in addition prevent an error in assembling a pickup unit, expansion and contraction of a component of the unit that are caused when the environment therearound changes, and the like from resulting in a spot of collected light missing photodetector 4.

Figure 22:
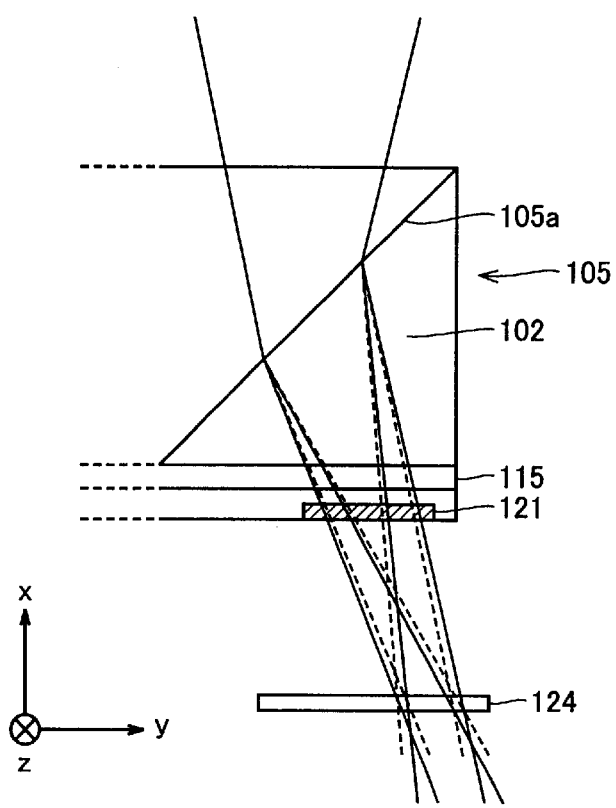
FIG. 22 illustrates light collected in a conventional optical pickup device.
Figure 23:
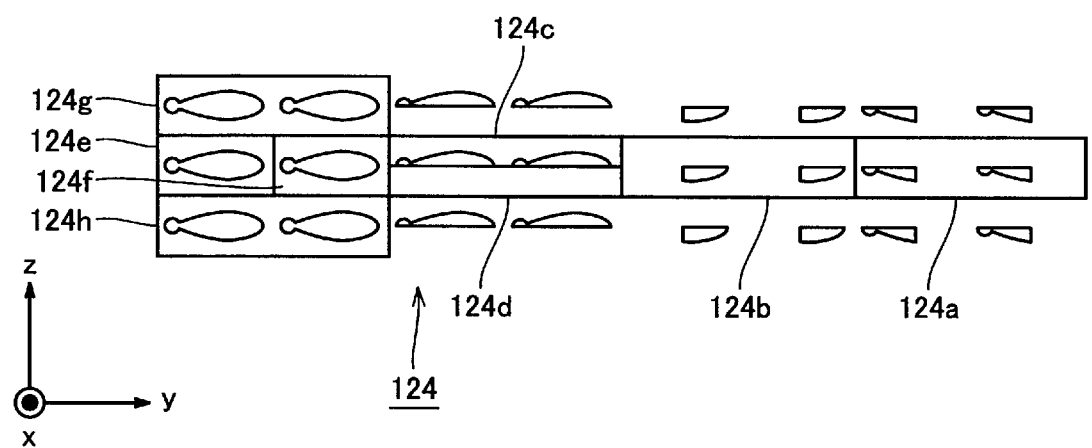
FIG. 23 illustrates a spot of light collected on a photodetector of a conventional optical pickup device.

By contrast, as a comparative example, an example with the first diffraction element 13 which is not structured to compensate for a wave aberration introduced through boundary surface 18, would be considered as follows: optical element 5 includes the first and third members 20 and 21 formed for example of SF2, a product of Schott Group having n of 1.635, and lithium niobate having no of 2.258 and ne of 2.178, respectively. In this example, there is a large difference between the refraction index of the first member 20 and the mean of the ordinary and extraordinary indexes of the third member 21, and at boundary surface 18 the ordinary and extraordinary rays of light refract significantly in the direction of axis+y and astigmatism and coma are introduced. Thus on photodetector 4 a large spot of collect light is formed, expanding relative to the width of photodetector 124, as shown in FIG. 22. Consequently, beam arrangement and design on photodetector 124 would be hard to provide, and in addition an error in assembling a pickup unit, expansion and contraction of a component of the unit that are introduced when the environment therearound changes, and the like may result in a spot of collected light missing photodetector 124.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device comprising:
    a light source;
    a lens arranged on an optical path extending from said light source to a magneto-optical recording medium;
    an optical element arranged on an optical path extending from said light source to said lens, and separating polarized light of light reflected by said magneto-optical recording medium; and
    a photodetector detecting light separated by said optical element, said optical element including
        a first member formed of an isotropic optical medium, receiving light from said light source and reflecting the received light to direct the reflected light to said magneto-optical recording medium,
        a second member formed of an isotropic optical medium and arranged adjacent to said first member, further passing the light reflected by said magneto-optical recording medium and having passed through said first member, and
        a third member formed of an anisotropic optical medium and arranged adjacent to said second member, separating via a boundary surface of said second and third members the light having passed through said second member, and directing the separated light to said photodetector.

2. The optical pickup device of claim 1, wherein said first member is a prism having a cross section in a parallelogram having first parallel surfaces opposite to each other and second parallel surfaces opposite to each other each having a predetermined angle relative to said first parallel surface, one of said first parallel surfaces being in contact with said second member, one of said second parallel surfaces being arranged opposite to said light source, the other of said second parallel surfaces being arranged opposite to said lens.

3. The optical pickup device of claim 1, wherein said first and second members have a uniform index of refraction.

4. The optical pickup device of claim 1, wherein:
    said anisotropic optical medium is LiNbO3; and
    a ratio of an index of refraction of said isotropic optical medium to a larger one of indexes of refraction of said anisotropic optical medium, is at least approximately 0.77.

5. The optical pickup device of claim 4, wherein said second and third members have said boundary surface with an angle α° relative to an optical axis of said reflected light to satisfy the following equation:

$$\alpha° = 65 \pm 5 \times (n/n1/0.77)$$

wherein n represents said index of refraction of said isotropic optical medium and n1 represents said larger one of indexes of refraction of said anisotropic optical medium.

6. The optical pickup device of claim 1, wherein:
    said anisotropic optical medium is YVO4; and
    a ratio of an index of refraction of said isotropic optical medium to a larger one of indexes of refraction of said anisotropic optical medium, is at least approximately 0.72.

7. The optical pickup device of claim 6, wherein said second and third members have said boundary surface with an angle α° relative to an optical axis of said reflected light to satisfy the following equation:

$$\alpha° = 67 \pm 7 \times (n/n1/0.72)$$

wherein n represents said index of refraction of said isotropic optical medium and n1 represents said larger one of indexes of refraction of said anisotropic optical medium.

8. The optical pickup device of claim 1, further comprising two ½ wavelength plates, one of said ½ wavelength plates being arranged between said light source and said boundary surface of said second and third members, the other of said ½ wavelength plates being arranged between said boundary surface of said second and third members and said lens.

9. The optical pickup device of claim 1, further comprising a diffraction element arranged between said optical element and said photodetector and having a hologram pattern compensating for a wave aberration introduced when said boundary surface of said second and third members refracts light.

10. The optical pickup device of claim 9, wherein said hologram pattern corresponds to a locus of a point H on said diffraction element satisfying a relationship:

$$(LH-PH)' = n\lambda$$

wherein L represents a point of light transmitted through a first diffraction element and collected, LH represents an optical path length between point H and a point L, P represents a point of light diffracted by said first diffraction element and collected on said photodetector, PH represents an optical path length between point P and point H, λ represents a wavelength of a beam of light, n represents an integer, (LH–PH)' represents a difference between optical path lengths LH and PH with said wave aberration at said boundary plane considered together with one of optical path lengths LH and PH.

11. An optical pickup device comprising:

a light source emanating a beam of light;

light collecting means receiving the beam of light emanating from said light source, and collecting the received beam of light on a magneto-optical recording medium;

an optical element formed of an isotropic optical member formed of an isotropic optical medium and an anisotropic optical member formed of an anisotropic optical medium, arranged between said light source and said light collecting means, said isotropic and anisotropic optical members having a boundary surface therebetween serving as a polarization separating surface;

a photodetector receiving light reflected by said magneto-optical recording medium and directed thereto; and a first diffraction element arranged between said optical element and said photodetector to receive and direct light from said optical element to said photodetector, said first diffraction element having a hologram pattern compensating for a wave aberration introduced when said boundary surface refracts light.

12. The optical pickup device of claim 11, wherein said hologram pattern corresponds to a locus of a point H on said first diffraction element satisfying a relationship:

$$(LH-PH)' = n\lambda$$

wherein L represents a point of light transmitted through a first diffraction element and collected, LH represents an optical path length between point H and a point L, P represents a point of light diffracted by said first diffraction element and collected on said photodetector, PH represents an optical path length between point P and point H, λ represents a wavelength of a beam of light, n represents an integer, (LH–PH)' represents a difference between optical path lengths LH and PH with said wave aberration considered together with one of optical path lengths LH and PH.

13. The optical pickup device of claim 12, wherein said first diffraction element is serrated, as seen in cross section.

14. The optical pickup device of claim 11, comprising signal detection means detecting a signal only via light diffracted by said first diffraction element.

15. The optical pickup device of claim 11, wherein said optical element has opposite sides each provided with a ½ wavelength plate of resin.

16. The optical pickup device of claim 11, wherein said light source and said photodetector are arranged in a single package having a translucent window and airtight sealed.

17. The optical pickup device of claim 11, wherein said isotropic optical member is formed of two isotropic optical media having different indexes of refraction and has a boundary surface formed by said two isotropic optical media and a boundary surface formed by said anisotropic medium and one of said isotropic media, the light reflected by said magneto-optical recording medium passing through both of said boundary surfaces successively.

* * * * *